United States Patent [19]
Shalom

[11] Patent Number: 6,003,889
[45] Date of Patent: Dec. 21, 1999

[54] SIMPLE DRIVE ASSEMBLY FOR BICYCLES WITH A PLAIN AXLE CONTAINING LARGER AND MORE DURABLE BEARINGS

[76] Inventor: Saeed Solomon Shalom, 50 Nehemya, Rishon Lezion, Israel

[21] Appl. No.: 08/519,012

[22] Filed: Aug. 24, 1995

[51] Int. Cl.$^6$ .................................................. F16C 9/02
[52] U.S. Cl. ...................... 280/259; 74/594.1; 384/545
[58] Field of Search ........................... 280/281.1, 259, 280/260, 261; 74/594.1, 594.2; 384/545, 589, 903

[56] References Cited

U.S. PATENT DOCUMENTS

| | | | |
|---|---|---|---|
| 601,710 | 4/1898 | Fay | 74/594.1 |
| 640,573 | 1/1900 | Latta | 280/259 |
| 648,077 | 4/1900 | Ludlow | 74/594.1 |
| 670,178 | 3/1901 | Latta | 74/594.1 |
| 689,984 | 12/1901 | Nowigk | 74/594.2 |
| 892,935 | 7/1908 | Cataldo | 74/594.1 |
| 1,398,883 | 11/1921 | Mottlau | 74/594.1 |
| 3,789,696 | 2/1974 | Beam, III | 74/594.1 |
| 3,888,136 | 6/1975 | Lapeyre | 280/259 |
| 3,903,754 | 9/1975 | Morroni | 74/594.2 |
| 4,089,540 | 5/1978 | Liljequist | 280/259 |
| 4,093,325 | 6/1978 | Troccaz . | |
| 4,145,095 | 3/1979 | Segawa | 74/594.1 |
| 4,171,822 | 10/1979 | Thun | 74/594.1 |
| 4,358,967 | 11/1982 | Kastan | 74/594.2 |
| 4,406,504 | 9/1983 | Coenen et al. | 74/594.1 |
| 4,429,890 | 2/1984 | Hon | 280/259 |
| 4,451,064 | 5/1984 | Perkins | 280/259 |
| 4,452,445 | 6/1984 | Csekes | 74/594.1 |
| 4,563,099 | 1/1986 | Brandenstein et al. . | |
| 4,715,246 | 12/1987 | Hartmann | 74/594.2 |
| 5,224,725 | 7/1993 | Eriston | 280/259 |
| 5,281,003 | 1/1994 | Herman | 74/594.1 |
| 5,301,571 | 4/1994 | Arrivabene | 74/594.3 |
| 5,426,997 | 6/1995 | Brion | 74/594.1 |

FOREIGN PATENT DOCUMENTS

| | | | |
|---|---|---|---|
| 507609 | 12/1951 | Belgium | 384/545 |
| 2328607 | 12/1976 | France . | |
| 133358 | 7/1901 | Germany . | |
| 19464 | of 1898 | United Kingdom | 384/545 |
| 429243 | 5/1935 | United Kingdom . | |
| 2292917 | 11/1995 | United Kingdom . | |
| WO94/20314 | 9/1994 | WIPO . | |

Primary Examiner—Kevin Hurley
Attorney, Agent, or Firm—Larson & Taylor

[57] ABSTRACT

A bottom bracket bearing assembly for bicycles comprising a plain axle 1 into which the inner rings of bearings 4, 4' employing steel rollers 3 or balls 3' may be pressed, the outer tracks of the bearings being provided within bracket cups 2, 2', whose outer diameters are adapted to be secured into the ends of the bracket shell 5. The bearings are held between pedal crank 8 and chain wheel 9 with a washer or a spring washer 6, expanding distance pieces 12, 13, or any suitable combination thereof. Pedal crank 8 or chain wheel crank 9 may be built into the axle.

4 Claims, 2 Drawing Sheets

SIMPLE DRIVE ASSEMBLY FOR BICYCLES WITH A PLAIN AXLE CONTAINING LARGER AND MORE DURABLE BEARINGS

FIELD AND BACKGROUND OF THE INVENTION

The present invention relates to pedal-operated cycles and particularly to the bottom bracket bearing assemblies of the drive transmission mechanism thereof. Its purpose is to make available to cyclists a universal "Do it yourself" bicycle drive assembly for improved and more efficient working over long periods, which anybody, handy with a hammer, should be able to dismantle and refit in a very short time.

SUMMARY OF THE INVENTION

In the usual construction of bottom bracket bearing assemblies, a single series of steel balls is arranged at each end of the bracket axle and the latter turns in direct contact of the balls, the axle having collars forming tracks for the balls which are arranged one by one in a free state to ran also on tracks provided by bracket cups that are threaded into the bottom bracket shell, the axle projecting at each end from the cups and the chainwheel being fixed at one end and a crank carrying a pedal at each end. The threaded bracket cup is associated with a check nut or ring and is used for adjusting purposes. One of the bracket cups has right hand threads, the other is left handed. A fact that confuses even some veteran cyclists.

In a second version of the bottom bracket bearing assembly common in Russian and German bicycles, the tracks mentioned above are arranged in reverse order and the inner rings 4' screw up on to the steel balls in the bracket cups by means of threads on both sides of the axle, again, one side right handed, the other left. The bracket cups have no threads in this case, and are pressed into the bore of the bracket shell, one on each side.

According to the present invention the bearing assembly comprises a plain axle on which the inner rings of bearings—using steel balls or rollers—may be pressed, one at each end, the outer tracks being provided within bracket cups with outside diameters suited to be spigotted or screwed into the bottom bracket shell.

The bearings are held in place between the two cranks, the travel of the cotter pin within the groove in the axle being used to close in on the bearing for adjustment, if necessary, with the help of washers or spring washers as distance pieces.

A rotating or fixed dust cap may be provided at the end of each bracket cup. In some cases a plain washer could serve the purpose of preventing dust from the bearings.

This arrangement allows me to employ bearings with taper rollers which make a greater total contact area than balls and leads to a more efficient running over longer periods of time and whether taper rollers or other rollers of cylindrical or barrel shape, or steel balls are used, greater overall diameters of the bearing are permissible.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
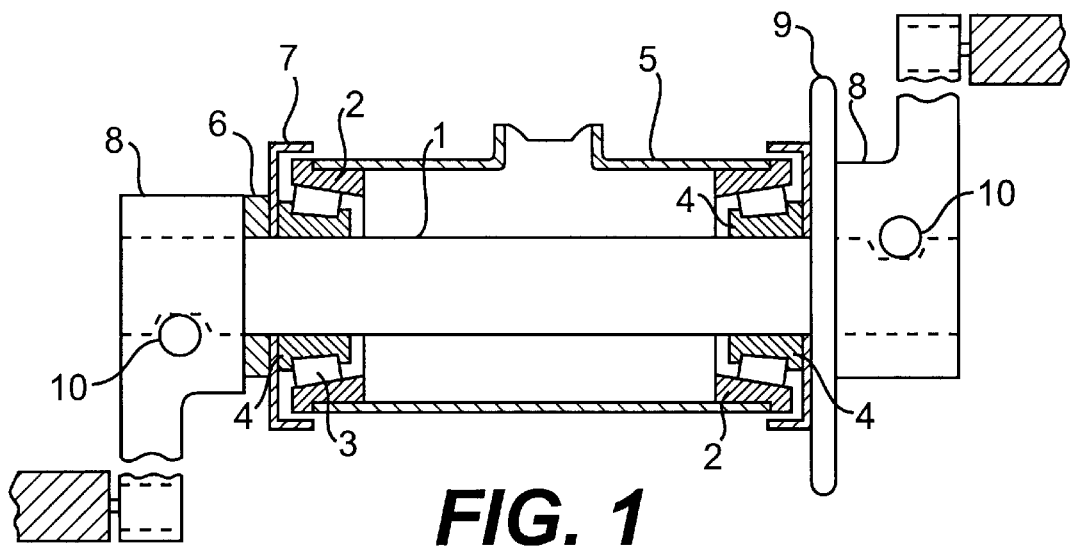
FIG. 1 shows a bottom bracket bearing assembly fitted with taper roller bearings.

FIG. 1 illustrates a bottom bracket bearing assembly fitted with taper roller bearings, the adjusting of the bearings being done with the help of washer or distance piece 6. A standard ⅝" spring washer may be used instead of distance piece 6, to make the bearing assembly into self adjusting.

Figure 2:
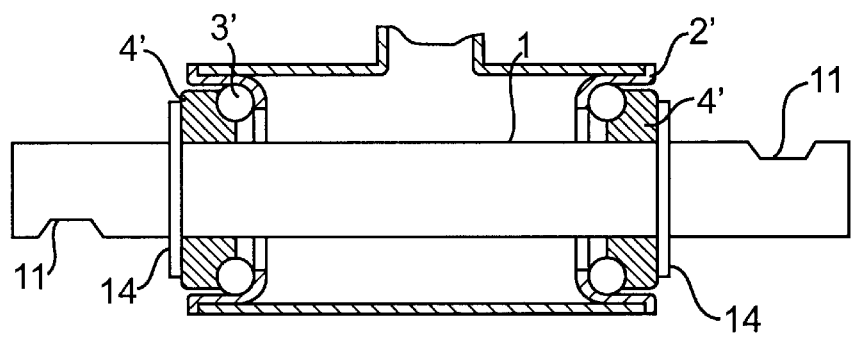
FIG. 2 shows a bearing assembly using steel balls.
Figure 2A:
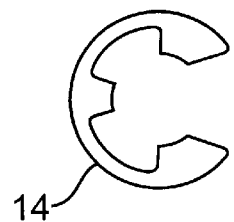

FIG. 2 illustrates a bearing assembly employing steel balls. The 3' greater total contact area of the steel balls achievable in this type of assembly together with the mobility of the inner rings ensure a greater adaptability of the bearings under conditions of wear, and a smoother operation of the pedals over a long period of time.

The purpose of the two circlips 14 in FIG. 2 is to-hold the inner rings 4' in place prior to fitting wheel 9 (in FIG. 1). The bracket axle 1 may be moved to the sides as necessary during the fitting process, since there are no grooves on the bracket axle for the circlips 14. Also here a self-adjusting bearing may be obtained by the use of a standard ⅝" spring washer. The bracket axle may also be provided with grooves for circlips 14 at one or both ends, for holding the bearings in place instead of the cranks.

Figure 3:
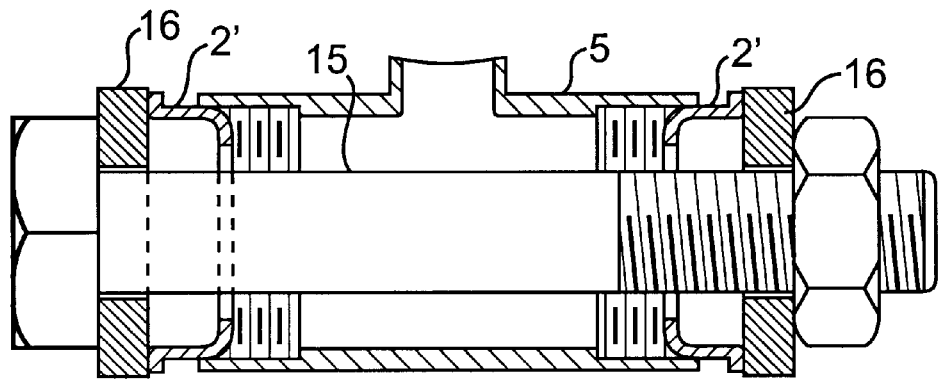
FIG. 3 shows the fitting of bracket cups with plain spigots into threaded bracket shells using a bolt and two washers.

FIG. 3 illustrates a simple method of fitting bracket cups 2' with plain spigots into threaded bracket shells 5, by means of a ¾" bolt 15 and two washers 16. In this case the spigots should be about a ¾ millimeter oversize, compared to the bore of the threaded portion of the bracket shell.

Figure 4:
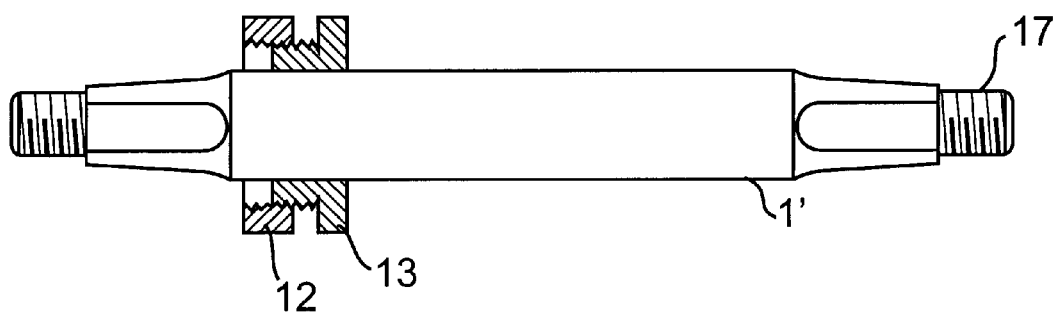
FIG. 4 shows a bracket axle to which the pedal cranks are connected in a fixed joint.
Figure 4A:
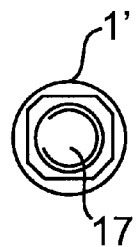

FIG. 4 illustrates a bracket axle 1' to which the pedal cranks are connected in a fixed joint which cannot be used for adjusting purposes.

Instead we have an expanding distance piece consisting of a bolt and nut unit, 13 and 12 in FIG. 4, which may be used for adjusting the bearings. Even here a ⅝" spring washer may be used at one or at both ends of the axle 1', to obtain a self adjusting bearing. In this case the threaded portion 17 of the axle should facilitate the pressing into place of the spring washer or washers, between the pedal crank and the inner ring.

The bracket cups 2, 2' in FIGS. 1 and 2 are made with a plain spigot. They may also be made screw threaded. The steel balls and rollers may be caged.

Referring to FIG. 1 the bracket axle is fitted at each end with a taper roller bearing. The bracket cups 2 with inner surfaces tapered to form the outer tracks of the rollers 3, are pressed one at each end of the bracket shell 5. An inner ring 4 together with caged taper rollers 3 is pressed into one end of the bracket axle 1, followed by the dust cap 7 and chain wheel 9 which is secured provisionally by means of cotter pin 10 to groove 11 one the axle.

The axle, in one piece with the chain wheel, is now inserted through the right end of the bracket shell 5, and the second inner ring 4 with caged rollers 3 is pressed into the bracket axle 1 at the opposite end and tapped gently in until the taper rollers 3 on both inner rings 4 are sitting firmly on their tracks within the two bracket cups 2. With the second dust cup 7 in place, the left crank should be pressing it on to the inner ring of the bearing when the second cotter pin is inserted pointing in the opposite direction to the first one. If it does not do so, it should be made to do so by inserting a suitable washer 6 between the crank and the dust cap 7.

In the process of finally securing the cotter pins, all slackness in the bearings should be taken up by gently tapping the cranks, one against the other. This adjustment is possible due to the fact that the groove 11 is wider than the cotter pin 10 allowing it, together with each crank, a travel of two to three millimeters from end to end of the groove. While driving the cotter pins in, or the two cranks towards each other, it is advisable to use two hammers, a heavier one as counter weight on the opposite crank or on the opposite side of the crank arm when a cotter pin is being driven in.

In FIG. 2, where the gap between the bracket cup 2' and the inner ring 4' is very small, there is no need for a dust cap. In such assemblies any play in the bearings could be eliminated by simply wedging an additional circlip 14 between a pedalcrank 8 and an inner ring 4'is very small, there is no need for a dust cap. The bearing assembly in FIG. 2 may be completed by fitting the pedal crank 8 and chain wheel 9;

a. By themselves; If steel balls are caged, without circlips.

b. With the help of a washer or washers as distance pieces;

c. With the help of a spring washer on one or on both sides of bracket axle;

d. With the help of an expanding distance piece (12, 13 in FIG. 4);

e. With any suitable combination of the above.

Most of these options also in bearing assemblies employing bracket axles 1' as in FIG. 4. In such assemblies any play in the bearing could be eliminated without dismantling the pedal cranks; by simply wedging an additional circlip 14 between the pedal crank and the inner ring.

The chain wheel 9 or pedal crank 8 may be built into the axles 1 or 1'(FIGS. 1 and 4). bracket axles 1 and 1' (FIGS. 1 and 4). A drive assembly according to this invention can employ larger steel balls in any given bore of bracket shell, be self-adjusting, and can be dismantled for inspection in less than 60 seconds.

While the invention has been described with respect to a limited number of embodiments, it will be appreciated that many variations, modifications and other applications of the invention may be made.

What is claimed is:

1. A bottom bracket assembly for cycles comprising a bracket axle, a pair of spaced bearings for supporting said axle in a bracket shell, each bearing having an inner bearing ring pressed onto said bracket axle, a plurality of cylindrical rollers, tapered rollers or balls, and an outer track provided within a bracket cup having an outer diameter for connection to an end of the bracket shell, and retaining means, comprising first and second cranks fixed to said axle outwardly of the inner rings at opposite ends of said axle, for holding said inner rings in adjusted spaced apart position, said first and second cranks being connected to each end of the axle by respective cotter pins; and said bracket axle including a groove at each end thereof, said bracket axle being threadless, and of substantially uniform diameter, between said grooves and each said groove being of a width greater than that of the cotter pin at the respective end of the axle so that the bearings can be adjusted by tapping on the cranks.

2. A bottom bracket assembly according to claim 1 wherein said bracket shell has an outer diameter substantially equal to the outer diameter of bracket cup.

3. A bottom bearing assembly for cycles comprising a pair of spaced bearings, a plain bracket axle on which said bearings are mounted, each of said bearings comprising an inner ring pressed onto said axle and employing steel balls rollers, or taper rollers, and an outer track defined by an inner surface of a bracket cup having an outer diameter adapted to be secured in one end of a bracket shell; and said assembly further comprising retaining means, comprising first and second cranks fixed to said bracket axle outwardly of the inner rings of the bearings at opposite ends of said axle, for retaining said inner rings in place, said retaining means further comprising a washer, a spring washer or an expanding spacer element, and said bearing being provided with a fixed or rotating dust cap or washer at the end of bracket cup, said first and second cranks being connected to said axle by cotter pins and said bracket axle including grooves at end thereof, said bracket axle being threadless, and of substantially uniform diameter, between said grooves and each of said grooves being of a width greater than that of the cotter pin at the respective end of the axle so that the bearings can be adjusted by tapping on the cranks.

4. A bottom bearing assembly according to claim 3 wherein said bracket shell has an outer diameter substantially equal to the outer diameter of bracket cup.

\* \* \* \* \*